Patented Apr. 19, 1949

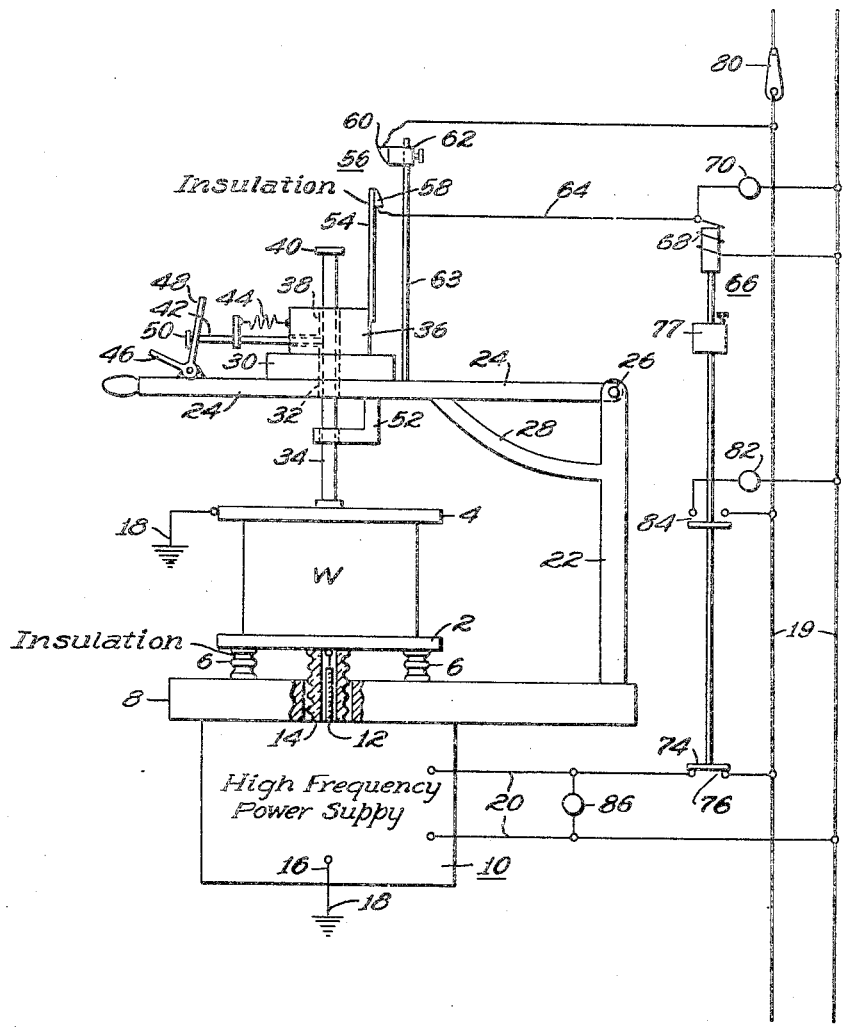

2,467,783

UNITED STATES PATENT OFFICE 2,467,783

DIELECTRIC HEATING MEANS AND CONTROL THEREFOR

Philip R. Sears, Mountainside, N. J., assignor to Westinghouse Electric Corporation, East Pittsburgh, Pa., a corporation of Pennsylvania Application September 20, 1947, Serial No. 775,279

5 Claims. (Cl. 219—47)

My invention relates to dielectric heating of plastic or other material which, during heat treatment, undergoes a change in size, more particularly an increase in thickness. More specifically, my invention is directed to the dielectric heating of preforms between two spaced relatively insulated heating-electrodes for the purpose of softening the preforms before they are placed in molding apparatus, the preforms being of a type which noticeably expand when so heated. The primary purpose for the preliminary heating of preforms before molding is to soften them from their original state.

The heating of preforms and similar substances on a mass production basis prior to being molded has been hindered by two factors. Different preforms are not always of precisely the same size; and because of such non-uniformity of physical dimensions, it has been customary to provide an air gap in series with each preform between the heating-electrodes so that preforms of different thicknesses can be successively softened with the same set of heating-electrodes. Another difficulty has been the lack of a positive operation on the heating means when a preform has been heat-treated to at least a minimum extent for further processing, so that an operator will not remove a preform before it has been softened. If the preliminary heating of the preform is stopped before the preform has become sufficiently soft, the mold in which it is subsequently molded may be damaged, perhaps beyond repair. Fortunately, a preform increases in thickness as it softens in a dielectric heating means and, in accordance with my invention, this change in thickness is used to show when the thickness has changed a definite amount indicative of satisfactory softening of the preform or is used to interrupt further heating so that better timing of the heat-treatment can be obtained and power can be conserved.

An object of my invention is to provide a dielectric heating means for materials which expand or decrease in density upon heating, the heating means comprising a pair of spaced relatively insulated heating-electrodes, one of which is relatively movable with respect to the other; the position of the movable electrode being controlled by the material between the heating-electrodes. In accordance with this aspect of my invention, the material to be dielectrically heat-treated is placed between two relatively insulated heating-electrodes of the plate type. The upper heating-electrode rests on the top of the material, and as the material expands, which is especially true if it contains blowing agents, the heating-electrode rises. This movement of the heating-electrode is utilized to operate a signal or to control the power to the heating-electrodes.

A movable supporting means or mechanism is provided for the movable heating-electrode to permit the dielectric heating means to be loaded. By lifting the supporting means, to which the movable heating-electrode can be locked, material can be initially placed between the relatively insulated heating-electrodes for heat-treatment. Lowering the supporting means places the movable heating-electrode over the material, and if the heating-electrode is unlocked from the supporting means it can subsequently rise as the material softens and increases in thickness, while still remaining in heat-treating position.

A special object of my invention is to provide an equipment of the foregoing type which can be easily operated without the need for any particular skill on the part of the operator.

Other objects, features, and innovations of my invention will be discernible from the following description of a prefered embodiment, which is to be taken in conjunction with the accompanying schematic drawing. The single figure of the drawing illustrates, in a simplified way, apparatus and electrical connections embodying my invention.

Referring to the drawing, a dielectric heating means is shown as comprising a pair of spaced relatively insulated relatively movable lower and upper heating-electrodes 2 and 4, the heating-electrodes being preferably metal plates. The lower heating-electrode 2 is attached to insulators 6 secured to a table 8 of a high frequency tube-oscillator generator 10. The high frequency power output of the generator 10 is delivered to the dielectric heating means through an insulated conductor 12, connected to the lower heating-electrode 2 through a bushing 14, and a conductor 16 electrically connected to the upper heating-electrode 4 in any suitable way, as, for example, through ground connections 18. The tube-oscillator generator 10 constitutes an electricity-absorbing device which, during operation, takes power from a commercial power line 19 and converts such generally available power to the desired high frequency across the conductors 12 and 16. Power is transfererd from the power line to the tube-oscillator generator 10 over a feed circuit 20 which includes parts that will be subsequently described.

The dielectric material to be heat-treated, or work W, rests on the lower heating-electrode 2. In the preferred embodiment, the upper heating-electrode 4 is loosely carried so that it bears or presses on the top surface of the work W which supports it; the resting place of the upper heating-electrode depending on whatever the thickness of the work W may happen to be. If power is now applied to the heating-electrodes 2 and 4, the work W heats and increases in thickness. This increase in thickness raises the heating-electrode 4, thereby increasing the spacing between the heating-electrodes 2 and 4. This movement of the heating-electrode 4 is utilized to operate mechanism which initiates control and signal operations.

The upper heating-electrode 4 is carried on a supporting means comprising an upright post or frame 22 which is secured to the table 8, and a support member 24 in the form of a bar or frame which is pivotally secured, as at 26, to the frame 22 at a point adequately above the upper heating-electrode 4. A curved bar 28 extends from the upright frame 22 and provides an abutment on which the support member 24 normally rests in a generally horizontal position and from which it can be raised in an obvious manner. The support member is provided with an integral boss 30 located over the upper heating-electrode 4; and a vertical hole 32 is provided through the support member 24 and its boss 30.

An undersized upright rod 34 passes through the hole 32, the rod 34 having a lower end which is secured to the top of the upper heating-electrode 4. A collar 36 is provided which has a central hole 38 through which the upper end of the rod 34 can slide. The collar normally loosely rests on the boss 30 of the support member 24. Accordingly, the rod 34 can slide in the hole 32 in the support member 26 and the hole 38 in the collar 36. Somewhat above the collar 36, the rod 34 is provided with a detachable stop 40 that is diametrically larger than the hole 38 in the collar.

A releasable mechanism is provided which mechanically clutches the collar 36 into locking or latching engagement with the rod 34, so that the collar will rise as the rod 34 is raised by movement of the upper heating-electrode 4, which occurs as the work W expands during heating. However, the latching mechanism can be actuated to release the collar from the rod.

The latching mechanism consists of a holding pin 42 which freely passes through a horizontal hole in the collar 36, and is spring-pressed by tension spring 44 tightly against the rod 34, so that the collar 36 will move with the rod 34. For releasing this latching or clutching mechanism, a release 46 in the form of a pivoted bell-crank, is suitably attached to the support member 24 for pulling on the pin 42 against the tension of the spring 44. The release 46 has an arm 48 adapted to engage a lug 50 on the holding pin 42 when the release 46 is manually rotated counter-clockwise. Such action pulls the pin 42 slightly away from the rod 34, so that the rod and heating-electrode 4 can drop onto any material under the heating-electrode. The stop 40 prevents the rod and heating-electrode from becoming completely disengaged from the support member 24; and a guide bearing 52, secured to the support member 24, may be provided for assuring rectilinear movement of the rod 34.

The apparatus thus far described can be operated as follows:

Work W can be placed between the heating-electrodes 2 and 4 by raising the support member 24 which in turn raises the upper heating-electrode 4 either because the collar 36 is latched to the rod 34 by the pin 42, or, if the collar is unlatched, because the collar 36 engages the stop 40 on the rod 34. When the support member 24 is returned toward normal position, the upper heating-electrode 4 will either rest on the work W or may be above it, depending on whether or not the release 46 is pulling against the tension of the spring 44. If the release has been so actuated, the heating-electrode 4 will rest on the work W when the support-member 24 reaches its final resting position against the bar 28, because the rod 34 attached to the heating-electrode 4, is free to slide in the holes 32 and 38 under the action of gravity. If the release 46 has not been actuated, the heating-electrode 4 may or may not rest on the work W, but in any event, subsequent actuation of the release places the equipment in heat-treating position with the heating-electrode 4 on the top of the work W, and the support member 24 against the bar 28. Thereafter, the release 46 is released so that the tension spring 44 pulls the pin 42 against the rod 34 and latches or clutches them together. Upon heating of the work W, the collar 36 rises with the heating-electrode 4 because the holding pin 42 is clutched to the rod 34.

Attached to the collar 36 is an upright insulating bar 54 for closing a switch 56 when the heating-electrode 4 has risen a definite amount. To this end, the switch 56 comprises a lower contact 58 secured to the insulating bar 54, and an upper contact 60 secured to an insulating bar 62 which is adjustably carried on an upright resilient bar 63 secured to the support member 24. By adjusting the upper switch contact 60 higher or lower on the bar 64, the amount of movement of the upper heating-electrode 4 for closing the switch 56 can be controlled.

The switch 56 is in a circuit 64 which includes a relay 66 having an operating coil 68 and an electricity-absorbing device in the form of a signal 70 in parallel with the relay-coil 68. When the switch 56 closes, the signal 70 operates and the relay-coil 68 of the relay 66 becomes energized, tending to raise a relay contact 74 from its back contacts 76 which are in the feed circuit 20 to the high frequency generator 10. The relay 66 is preferably of the time delay type and includes a timing mechanism 77. The timing mechanism is preferably such that the relay can be made to raise its contact 74 instantaneously upon closure of the switch 56, or after any suitable fixed period after such closure. After such time, determined by the timing mechanism 77, has elapsed the relay contact 74 separates from its back contacts 76 and interrupts the feed circuit 20 to the high frequency generator 10, thereby cutting off power from across the heating-electrodes 2 and 4.

The signal 70 gives an indication that the work W has been heat-treated to a point where its thickness has increased to a predetermined value, determined by the adjustment of the switch contact 60. An operator can thereupon open a main switch 80 for deenergizing the apparatus and then reload the apparatus with a new piece of work to be heat-treated; or he can wait until after the heat-treatment of the work W has continued for a predetermined time after the work-thickness has reached such aforesaid value, the time being automatically determined by the timing mechanism 77. A signal 82 controlled by a normally open contact 84 of the relay 66 can be added to indicate when such additional time has elapsed. Operation of contact 74 to raised position automatically stops further heating of the work W after such time.

When a new piece of work of lesser thickness than the treated work is placed on the lower heating-electrode 2, by raising and then lowering the support member 24, the heating-electrode 4 will drop on the new work. The collar 36 will likewise fall so that the switch contacts 58 and 60 of the switch 56 are separated and the switch 56 opened, so that the circuit 64 is interrupted. If the main switch 80 has not been opened, de-energization of the circuit 64 lowers the relay contacts 84 and 74. If the main switch has been opened, the relay contacts will already have been in lower positions. In lowered position, the contact 74 completes the feed circuit 20, and the generator 10 is reenergized when the main switch 80 is closed. A signal 86 may be provided across the feed circuit 20 on the generator side of the relay contact 74, for indicating when the generator is energized.

While I have described my invention in a simplified and preferred form, it is obvious that it is subject to wide variations and modifications.

I claim as my invention:

1. Dielectric heating mechanism of a type described for heating a material which changes in size upon heating with high-frequency, comprising, in combination, a pair of spaced relatively insulated heating-electrodes, supporting means for relatively movably supporting said heating-electrodes in heat-treating position for heat-treating said material therebetween, said supporting means comprising a support member loosely and movably positioning a first of said heating-electrodes so that it tends to move toward the other heating-electrode, whereby said first heating-electrode is in contact with a surface of the material in different positions of said surface, a switch, and an interconnecting switch-operating mechanism movable with said first heating electrode; said switch including a pair of spaced switch-contacts, one of which is carried by said support member and the other by said mechanism, whereby said mechanism causes said switch to be operated when said first heating-electrode is moved to a predetermined position by a change in size of the material being heat-treated.

2. Dielectric heating mechanism of a type described for heating a material which changes in size upon heating with high-frequency, comprising, in combination, a pair of spaced relatively insulated heating-electrodes; supporting means for relatively movably supporting said heating-electrodes in heat-treating position for heat-treating said material therebetween, said supporting means comprising a support member loosely and movably positioning a first of said heating-electrodes so that said first heating-electrode tends to press toward the other heating-electrode, whereby said first heating-electrode is in contact with a surface of the material in different positions of said surface; a switch; and an interconnecting switch-operating mechanism movable with said first heating-electrode; said switch including a pair of spaced switch-contacts, one of which is carried by said support member and the other by said mechanism, said mechanism causing said switch to be operated when said first heating-electrode is moved a definite amount by a change in size of the material being heat-treated, one of said switch-contacts being adjustable to vary the spacing between it and the other switch-contact, whereby to adjust the distance which said first heating-electrode must move to operate said switch.

3. Dielectric heating mechanism of a type described for heating a material which changes in size upon heating with high-frequency, comprising, in combination, a lower heating-electrode, an upper heating-electrode, supporting means for supporting said heating-electrodes in heat-treating position so that said upper heating-electrode is vertically movable with respect to said lower heating-electrode, said supporting means comprising a support member above said upper heating-electrode, said support member having a guide, an upright rod slidable in said guide, said rod being attached to said upper heating-electrode, a switch, a switch-operating member, and a releasable latch for detachably securing said switch-operating member to said rod for movement therewith.

4. Dielectric heating mechanism of a type described for heating a material which changes in size upon heating with high-frequency, comprising, in combination, a lower heating-electrode, an upper heating-electrode, supporting means for vertically relatively movably supporting said heating-electrodes in heat-treating position for heat-treating said material therebetween, said supporting means comprising a support member above said upper heating-electrode said support member having a guide, an upright rod slidable in said guide, said rod being attached to said upper heating-electrode, a collar loosely around said rod and above said heating-electrode, releasable means for latching said collar to said rod, a switch, and a switch-operating member attached to said collar.

5. Dielectric heating mechanism of a type described for heating a material which changes in size upon heating with high-frequency, comprising, in combination, a lower heating-electrode, an upper heating-electrode, supporting means for vertically relatively movably supporting said heating-electrodes in heat-treating position for heat-treating said material therebetween, said supporting means comprising a support member above said upper heating-electrode, said support member having a guide, an upright rod slidable in said guide, said rod being attached to said upper heating-electrode, said rod extending through said guide and above said support member, said support member being raisable with respect to said lower heating-electrode, a stop on said rod, said stop being above said guide, means comprising a circuit for applying high-frequency power to said heating-electrodes, means comprising a switch for controlling said circuit, a switch-operating member, and a releasable latch for detachably securing said switch-operating member to said rod for movement therewith.

PHILIP R. SEARS.

REFERENCES CITED

The following references are of record in the file of this patent:

UNITED STATES PATENTS

| Number | Name | Date |
| --- | --- | --- |
| 1,402,722 | Josephs et al. | Jan. 3, 1922 |
| 1,402,723 | Josephs et al. | Jan. 3, 1922 |
| 2,324,068 | Crandell | July 13, 1943 |
| 2,401,991 | Walton et al. | June 11, 1946 |

FOREIGN PATENTS

| Number | Country | Date |
| --- | --- | --- |
| 556,292 | Great Britain | Sept. 28, 1943 |